United States Patent
Casey

[15] 3,650,582
[45] Mar. 21, 1972

[54] HYDRO-STATIC BEARING AIR SEAL
[72] Inventor: Richard H. Casey, Bay City, Mich.
[73] Assignee: General Motors Corporation, Detroit, Mich.
[22] Filed: Apr. 15, 1970
[21] Appl. No.: 28,849

[52] U.S. Cl. ..........................308/36.3, 277/15, 308/9
[51] Int. Cl. ..........................F16c 33/72, F16c 17/16
[58] Field of Search...............308/36.3, DIG. 1, 9; 277/3, 277/15, 27, 53, DIG. 5

[56] References Cited

UNITED STATES PATENTS

| | | | |
|---|---|---|---|
| 3,090,654 | 5/1963 | Wald et al. | 277/3 X |
| 2,407,807 | 9/1946 | Bentley | 308/36.3 |
| 2,504,899 | 4/1950 | Sterrett | 308/36.3 |
| 2,682,991 | 7/1954 | Craig et al. | 308/36.3 X |
| 2,125,446 | 8/1938 | Hurtt | 308/36.3 |

Primary Examiner—Martin P. Schwadron
Assistant Examiner—Barry Grossman
Attorney—Jean L. Carpenter and F. J. Fodale

[57] ABSTRACT

A machine tool spindle having a rotor supported on an externally pressurized liquid film oil bearing is provided with air seals. The air seals comprise annular grooves adjacent the outboards on the spindle which are fed air under pressure. An intermediate groove is provided to limit the aeration of oil to a small portion of oil which overflows from the oil bearing exhaust groove thereby improving pump efficiency and bearing stiffness.

3 Claims, 3 Drawing Figures

Patented March 21, 1972

3,650,582

INVENTOR.
Richard H. Casey
BY
F. J. Fodale
ATTORNEY

HYDRO-STATIC BEARING AIR SEAL

My invention relates generally to hydro-statically supported machine tool spindles wherein the lubricant is oil or the like and more specifically to the sealing of such a machine tool spindle to prevent the escape of oil out of the ends of the spindle along the rotating shaft.

Hydro-statically supported machine tool spindles with a liquid lubricant are advantageous where tolerances within a few microns are required. Such tolerances are possible because of the high stiffness of the bearings which by their nature are also susceptible to high speed operation. One of the disadvantages of such machine tool spindles, however, is in connection with the requirement of a continuous flow of lubricant into and out of the bearing. This requirement poses a unique sealing problem especially in the case of high speed spindles where contact-type seals are inadequate because of the heat generated at high speeds. In such a case, externally pressurized air seals have heretofore been proposed. Such air seals while successful in providing an adequate seal, aerate the lubricant which in the case of oil causes foaming of the oil as it is drained from the bearing resulting in the loss of oil pump efficiency and in the loss of bearing stiffness. The loss in bearing stiffness in turn affects the machining accuracy of the spindles. Accordingly, it is broadly the object of my invention to provide a suitable seal for a hydro-static liquid bearing without materially affecting the operation of the hydro-static liquid bearing.

Another object of my invention is to provide a suitable air seal for a radial hydro-static oil bearing without suffering a loss in either oil pump efficiency or bearing stiffness.

Another object of my invention is to provide a high speed machine tool spindle having hydro-static oil bearings which are sealed against the loss of oil without materially affecting the accuracy of the spindle.

Other objects and many of the attendant advantages of this invention will be readily appreciated as the same becomes better understood by reference to the following detailed description when considered in connection with the accompanying drawings in which like reference numerals designate like parts through the figures thereof and wherein.

Figure 1:
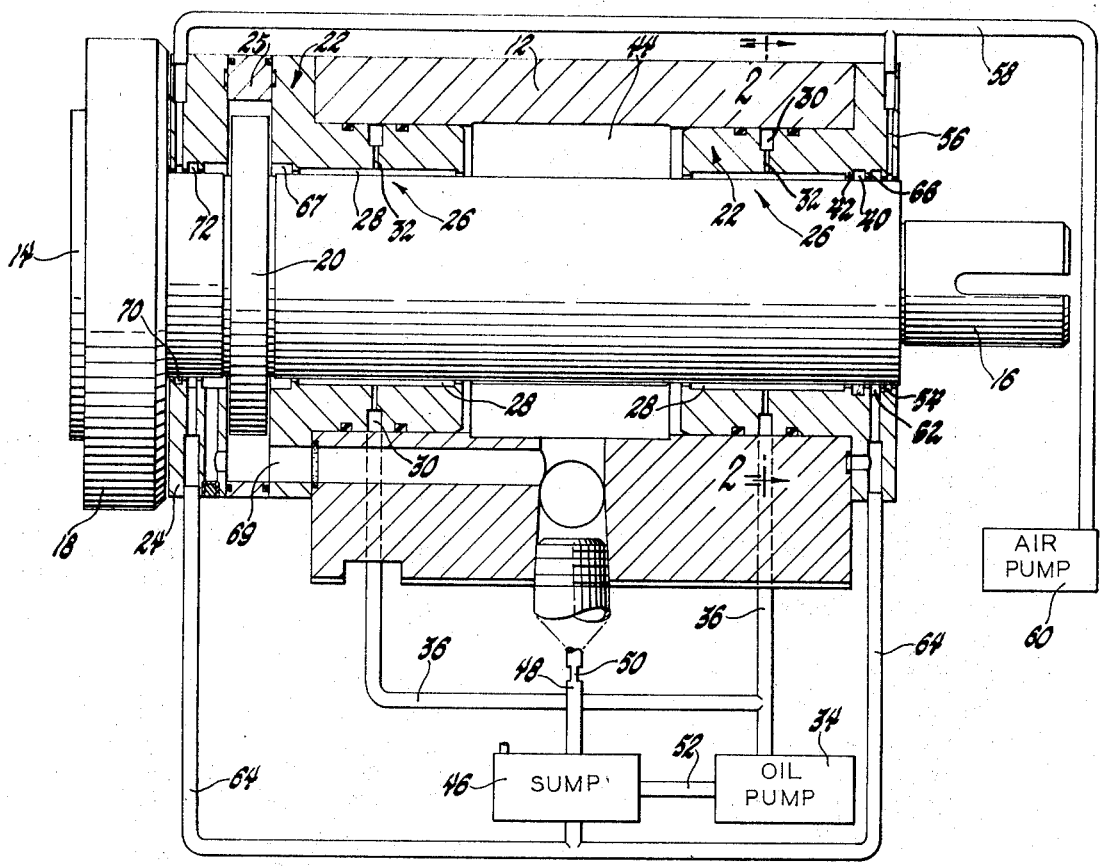
FIG. 1 is an axial section of a machine tool in accordance with my invention and wherein certain elements of the spindle are shown schematically.

Referring now to the drawings and more particularly to FIG. 1, the machine tool spindle in accordance with my invention is shown partially schematically with the air and oil pumps and the sump blocked in and with conduits and passages located for clarity of description. While engineering practice may dictate relocation of these various passages and conduits as well as require various fittings and seals not shown, a full understanding of my invention can be had from a consideration of FIG. 1 as the partially schematic nature thereof does not affect in any way the principles behind its operation.

The machine tool spindle comprises a housing 12 in which is rotatably mounted a shaft 14. The right-hand end of the shaft 14 includes a mechanical connector 16 by which the shaft is driven from a power source (not shown). The left-hand end of the shaft 14 is enlarged to provide a chuck 18 for attaching a tool such as a grinding wheel to the shaft 14. An intermediate collar 20 on the shaft 14 axially locates the shaft 14 with respect to the housing 12 as hereinafter will more fully be explained. Mounted in each end of the housing 12 are end caps 22. The outboard face of the left end cap 22 lies closely adjacent but is slightly spaced from the inboard end face of the collar 20 on shaft 14. An end plate 24 provides a surface in the same relationship to the outboard face of the collar 20 by reason of a spacer 25 between the left end cap 22 and the end plate 24. Both end caps 22, spacer 25, and end plate 24 are secured to the housing 12 in any suitable manner, however, the securing means has been omitted from the drawings for the sake of clarity.

Figure 2:
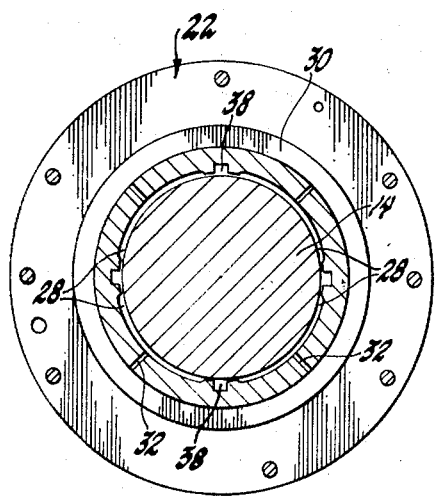
FIG. 2 is a section taken along the line 2—2 of FIG. 1 and looking in the direction of the arrows.
Figure 3:
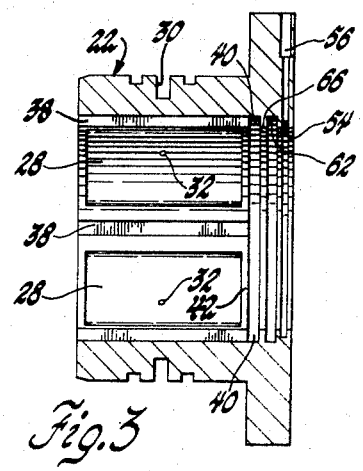
FIG. 3 shows the right end cap used in FIG. 1 but with the shaft removed to show internal recesses and grooves in the end cap.

The shaft 14 is rotatably supported in the housing and its attached parts by externally pressurized liquid film bearings indicated generally at 26, the description and function of which will now be given in connection with the right end cap 22 shown in FIGS. 2 and 3. As can be seen from these figures, the bore of the right end cap 22 is provided with a number of circumferentially spaced recesses 28, each of which is connected to a plenum 30 through a small orifice 32. The recesses 28 are separated by lands provided with a longitudinal exhaust groove 38. While it might appear that the lands contact the shaft 14, there is actually a small spacing between the shaft 14 and the lands on the order of a few thousandths of an inch.

The longitudinal exhaust grooves 38 are connected to a circumferential exhaust groove 40 at the outboard side of the recess 28. From FIG. 1, it might appear that the land 42 separating the recess 28 from the circumferential exhaust groove 40 contacts the shaft 14. However, as with the lands previously described, this land likewise is actually spaced a few thousandths of an inch from the surface of shaft 14. The operation of an externally pressurized liquid film bearing depends upon the continuous flow of a liquid, such as oil, into the recess where it develops a relatively high pressure to support the shaft. To this end, the plenums 30 in each of the end caps 22 are supplied oil under pressure from the oil pump 34 through conduits 36. The oil flows from the plenum 30 into the recesses 28 through the orifices 32 and develops sufficient pressure to support the shaft 14 out of contact with any portion of the end cap 22. In an actual spindle which I have successfully operated, the pressure in the recesses is on the order of 500 p.s.i.

From the recesses 28, the oil flows over the lands surrounding the recesses and into the exhaust grooves 38 and 40 from which it is collected in an internal chamber 44 which returns the oil to a vented sump 46 through conduit 48. The conduit 48 includes a restrictor 50, the function of which will be hereinafter more fully explained. The sump 46 is connected to the intake side of the oil pump 34 through conduit 52. Thus the oil flows a closed circuit path from the oil pump through conduit 36 to plenum 30 through the orifices 32 into the recesses 28 from which it exhausts into the grooves 38 and 40 from which it is collected and returned to the sump 46 which supplies the intake of the oil pump 34. From a consideration of FIG. 1, it can be appreciated that since there is some pressure in the oil in the exhaust groove 40, it is capable of flowing out of the spindle housing along the shaft 14 as well as flowing toward the chamber 44. Thus it becomes desirable to seal the outboard end of the exhaust groove 40. To this end, my invention includes the provision of two additional circumferential grooves in the right end cap 22. The outermost groove 54 is connected through a passage 56 and a conduit 58 to an air pump 60. When air is supplied to the groove 54 at a pressure substantially equal to the pressure of the oil in exhaust groove 40 theoretically neither should flow into the other thereby providing an air seal preventing the escape of oil. Practically, however, this critical balance is not easily attainable usually resulting in approximately half of the air supplied to the groove mixing with the oil in the oil bearing system. This mixing occurs in an area adjacent the high speed shaft 14 which highly aerates or foams the oil. Foaming of the oil increases its temperature, decreases the efficiency of the oil pump 34 and makes the bearing less stiff. In order to alleviate this problem, I have provided the intermediate groove 62 which is connected by a separate conduit 64 to the sump 46. Recall that the conduit 48 included a flow restrictor 50. By a suitable selection of the restrictor 50, I am able to adjust the back pressure of the overflow oil in the exhaust groove 40 to a value substantially equal to or slightly greater than the pressure of the air in the air seal groove 54. In the aforementioned successfully operated spindle, the oil back pressure and the air pressure were in the range of 20 to 30 p.s.i. Under these conditions, a very slight amount of oil flows over the sill 66 separating the circumferential exhaust groove 40 from the intermediate groove 62. This slight amount of flow gives two benefits, namely, it is sufficient to maintain the area of the shaft 14 adjacent the sill 66 relatively cool by the oil flow and it limits the amount of oil subject to contact with the air from the air seal groove 54 to the small amount of oil which flows over the sill. By suitable selection of the restrictor 50, this oil flow can be limited to approximately 1 percent of the oil flowing through the bearing system. Thus the aeration of the oil is substantially reduced resulting in a sealed spindle in which pump efficiency and bearing stiffness have been improved over systems heretofore known. Stated another way, neither of these characteristics have been materially affected by the addition of seals to an unsealed spindle. Thus the seals also do not materially affect the accuracy of the spindle which in large part depends on bearing stiffness.

While my explanation has been confined to a discussion of the right-hand portion of the spindle, the same explanation holds true for the left-hand portion of the spindle. The only difference lies in the fact that I have chosen a nontraveling type spindle for this disclosure. In such spindles, the shaft 14 is axially located by means of two opposed externally pressurized liquid film oil bearings which act on the opposite faces of the shaft collar 20. For the sake of clarity, the recesses and their feed passages and conduits to the areas of the left end cap 22 and the end plate 24 adjacent the faces of the collar 20 have been omitted. However, these recesses like the recesses 28 in the left-hand bearing 26 would overflow into the annular exhaust passage 67 which, of course, is on both sides of the collar 20. The annular exhaust passage 67 in addition to feeding back to the chamber 44 through axial exhaust grooves also feeds into the conduit 48 through passage 69. As before, an outboard air seal groove 70 is provided on the right outboard end of the end plate 24 and an intermediate mixing groove 72 returns the small amount of aerated oil back to the vented sump 46 through conduit 64 which is separate from the main return conduit 48.

I wish it to be understood that I do not desire to be limited to the exact details of construction shown and described, for obvious modifications will occur to a person skilled in the art.

I claim:

1. A high speed machine tool spindle comprising in combination, a shaft, a housing surrounding said shaft and having radial externally pressurized, liquid film oil bearing means, said oil bearing means including a number of circumferentially spaced recesses opening toward said shaft, an orifice opening into each of said recesses to supply oil thereto, oil pump means, conduit means leading from said oil pump means to said orifices, and oil return means leading from said recesses to said oil pump means, said oil return means including circumferential exhaust groove means outboard of and adjacent to said recesses, a vented sump and a flow restrictor upstream of said sump, said machine tool spindle further including circumferential mixing groove means adjacent said exhaust groove means to the outboard side thereof, conduit means leading from said circumferential mixing groove means to said sump, circumferential air seal groove means adjacent said circumferential mixing groove means to the outboard side thereof, air pump means, and conduit means leading from said air pump means to said circumferential air seal groove means, said flow restrictor in said oil return means being sized such that during operation the pressure of oil in said exhaust groove means is substantially equal to or slightly greater than the pressure of air in said circumferential air seal groove means whereby the aeration of oil is substantially limited to a relatively small amount of oil overflowing from said exhaust groove means into said second groove means whereby said oil bearing means is sealed against loss of oil without affecting the efficiency of said oil pump means and the stiffness of said oil bearing means.

2. In combination with a shaft rotatably supported by an externally pressurized liquid film bearing wherein the liquid is gasifiable and is circulated through a closed system including a pump, a sump and a circumferential exhaust groove fluidly connected to the sump, an externally pressurized gas seal comprising, an annular member substantially concentric with said shaft, said annular member having first and second spaced circumferential grooves opening toward said shaft with said first groove being positioned adjacent the circumferential exhaust groove of said bearing, conduit means fluidly connecting said first groove to said sump, means to supply gas under pressure to said second groove to prevent the escape of liquid out of said closed system, and means in said closed system to maintain the pressure of said liquid in said circumferential exhaust groove substantially equal to or slightly greater than the pressure of said gas in said second groove whereby the mixing of said liquid and said gas is limited to a small portion of said liquid overflowing into said second groove whereby the gasification of said liquid is substantially reduced to improve the stiffness of said bearing and the efficiency of the pump supplying the externally pressurized liquid.

3. In combination with a movable member supported by an externally pressurized liquid film oil bearing having a pressure recess opening toward the member and a drain groove adjacent said recess fluidly connected to a sump, an externally pressurized gas seal to limit the flow of liquid out of said drain groove in a direction away from said recess comprising, a stationary member having a surface spaced closely adjacent said movable member, first and second spaced grooves in said surface opening toward said movable member, said first groove being positioned adjacent said drain groove, conduit means fluidly connecting said first groove to said sump, means to supply gas under pressure to said second groove to prevent the escape of oil out of said bearing, and means between said recess and sump to maintain the pressure of oil in said drain groove substantially equal to or slightly greater than the pressure of gas in said second groove whereby mixing of said oil and said gas is substantially eliminated in said exhaust groove and said second groove limiting the gasification of said oil substantially to that portion of the oil overflowing into the first groove whereby a seal is provided without materially affecting the characteristics of the bearing.

* * * * *